US006656256B2

(12) United States Patent
Moreland

(10) Patent No.: US 6,656,256 B2
(45) Date of Patent: *Dec. 2, 2003

(54) SCENTED JET INK AND PRINTED ARTICLES THEREFROM

(75) Inventor: Richard B. Moreland, Centerville, OH (US)

(73) Assignee: NCR Corporation, Dayton, OH (US)

( * ) Notice: Subject to any disclaimer, the term of this patent is extended or adjusted under 35 U.S.C. 154(b) by 174 days.

This patent is subject to a terminal disclaimer.

(21) Appl. No.: 09/864,388

(22) Filed: May 25, 2001

(65) Prior Publication Data

US 2002/0174800 A1 Nov. 28, 2002

Related U.S. Application Data

(63) Continuation of application No. 09/183,265, filed on Oct. 30, 1998, now Pat. No. 6,261,347.

(51) Int. Cl.$^7$ ................................. C09D 11/02
(52) U.S. Cl. ................. 106/31.02; 106/31.27; 106/31.33; 106/31.6; 106/31.65
(58) Field of Search ............. 106/31.02, 31.27, 106/31.33, 31.6, 31.65

(56) References Cited

U.S. PATENT DOCUMENTS

| | | | |
|---|---|---|---|
| 437,781 A | 10/1890 | Higgins | |
| 730,897 A | 6/1903 | Fisher | |
| 1,320,631 A | 11/1919 | Luscher | |
| 1,816,978 A | 8/1931 | Knight | |
| 2,578,425 A | 12/1951 | Hershkowitch | |
| 2,618,892 A | 11/1952 | Locks et al. | |
| 3,400,890 A | 9/1968 | Gould | |
| 3,465,350 A | 9/1969 | Keur et al. | |
| 3,465,351 A | 9/1969 | Keur et al. | |
| 3,567,119 A | 3/1971 | Wilbert et al. | |
| 3,663,278 A | 5/1972 | Blose et al. | |
| 3,888,689 A | 6/1975 | Maekawa et al. | |
| 4,258,367 A | 3/1981 | Mansukhani | |
| 4,484,768 A | 11/1984 | Norfleet | |
| 4,923,749 A | 5/1990 | Talvalkar | |
| 4,940,584 A | 7/1990 | Tararuj et al. | |
| 4,990,186 A | 2/1991 | Jones et al. | |
| 5,039,243 A | 8/1991 | O'Brien | |
| 5,474,805 A | 12/1995 | Vaughn | |
| 5,577,947 A | 11/1996 | Malloy et al. | |
| 5,641,346 A | 6/1997 | Mantell et al. | |
| 5,663,217 A | 9/1997 | Kruse | |
| 5,672,198 A | 9/1997 | Belmont | |
| 5,711,791 A | 1/1998 | Croker et al. | |
| 5,755,860 A | 5/1998 | Zhu | |
| 6,123,757 A | 9/2000 | Yang et al. | |
| 6,261,347 B1 * | 7/2001 | Moreland | 106/31.02 |

FOREIGN PATENT DOCUMENTS

| | | | |
|---|---|---|---|
| AU | 58043 | | 1/1975 |
| GB | 602482 | | 5/1948 |
| JP | 59/145263 | | 8/1984 |
| JP | 60/032867 | | 2/1985 |
| JP | 63-223078 A1 | * | 9/1988 |
| JP | 03-002867 | | 1/1991 |
| JP | 07053904 | | 2/1995 |
| JP | 08109346 | | 4/1996 |
| JP | 08-283645 A1 | * | 10/1996 |
| JP | 10-003673 | | 1/1998 |
| JP | 10-003674 | | 1/1998 |
| JP | 2000-000977 | | 1/2000 |
| JP | 2002-005263 | | 1/2002 |

OTHER PUBLICATIONS

Derwent abstract of JP62–223078, Sep. 1988.*
Derwent abstract of JP08–283645, Oct. 1996.*
English translation of JP 08–283645, Oct. 1996.*
Air Delights: Air Fresheners, Aroma–Therapy, Odor Control, web site—http://www.airdelights.com, p. 1., Nov. 1998.
Derwent Abstract of JP60.032867, Feb. 1985.
Derwent Abstract of JP59/145263, Aug. 1984.

* cited by examiner

*Primary Examiner*—Helene Klemanski
(74) *Attorney, Agent, or Firm*—Millen, White, Zelano & Branigan, P.C.

(57) ABSTRACT

A scented ink composition suitable for use in ink jet printing which generates aromas during printing and produces scented printed articles such as greeting cards.

3 Claims, No Drawings

SCENTED JET INK AND PRINTED ARTICLES THEREFROM

This application is a continuation of Ser. No. 09/183,265 filed on Oct. 30, 1998 which issued as U.S. Pat. No. 6,261,347

BACKGROUND OF THE INVENTION

The invention relates to scented ink compositions for ink jet printers which generate aromas from the printer during operation and scented printed articles produced therefrom.

The pleasing effects of fragrant substances has lead to many products and methods for providing pleasant aromas to the olfactory senses such as perfumes, oils, soaps, lotions, creams, aromatic candles, room fresheners, potpourri, etc. In recent years there has been an increased interest in fragrances by those who believe the aromas from essential oils have therapeutic effects. The use of such oils is commonly referred to as aroma therapy but therapeutic benefits beyond the pleasing effects of their aroma has not been recognized by the FDA.

Apparatus for releasing fragrant aromas into a room have varied widely from manual to automatic dispensers such as the apparatus described in U.S. Pat. Nos. 2,618,892; 3,400,890 and 4,484,768 and the battery operated aerosol, gel and pump air fresheners of AIR DELIGHTS™ of Portland Oreg.

The media from which fragrant substances are released has also varied widely from liquids, gels, solids and aerosols. The diffusion of fragrant vapors from polymers described in U.S. Pat. No. 3,567,119 is one example. The use of scented inks, paints and marking compositions (crayons) to prepare scented articles is well known as described in U.S. Pat. Nos. 2,578,425; 5,474,805 and 5,577,947. These inks, paints and marking compositions have been adapted for printing methods other than ink jet printing.

Ink jet printing has experienced a significant increase in use in recent years due to reduced equipment cost, color availability and improvements in print speed and print resolution. There are two major categories of ink jet printing—"Drop-on-Demand" and "continuous" ink jet printing. For continuous ink jet printing, a conducting ink is supplied under pressure to an ink nozzle and forced out through a small orifice. Prior to passing out of the nozzle, the pressurized ink stream proceeds through a ceramic crystal which is subjected to an electric current. This current causes a piezoelectric vibration equal to the frequency of the AC electric current. This vibration, in turn, generates the ink droplets from the unbroken ink stream. The ink stream breaks up into a continuous series of drops which are equally spaced and of equal size. Surrounding the jet, at a point where the drops separate from the liquid stream in a charge electrode, a voltage is applied between the charge electrode and the drop stream. When the drops break off from the stream, each drop carries a charge proportional to the applied voltage at the instant at which it breaks off. By varying the charge electrode voltages at the same rate as drops are produced it is possible to charge every drop to a predetermined level. The drop stream continues its flight and passes between two deflector plates which are maintained at a constant potential. In the presence of this field, a drop is deflected towards one of the plates by an amount proportional to the charge carried. Drops which are uncharged are undeflected and collected into a gutter to be recycled to the ink nozzle. Those drops which are charged, and hence deflected, impinge on a substrate traveling at a high speed at right angles to the direction of drop deflection. By varying the charge on individual drops, the desired pattern can be printed.

In a typical "Drop-on-Demand" ink jet printing process, a fluid ink is forced under pressure through a very small orifice of a diameter typically about 0.0024 inches in the form of minute droplets by rapid pressure impulses. The rapid pressure impulses are typically generated in the print head by either expansion of a piezoelectric crystal vibrating at a high frequency or volatilization of a propellant within the ink by rapid heating cycles. The piezoelectric crystal expansion causes the ink to pass through the orifice as minute droplets in proportion to the number of crystal vibrations. Thermal jet printers employ a heating element within the print head to volatilize a propellant and form droplets in proportion to the number of on-off cycles for the heating element. The ink is forced out of the nozzle when needed to print a spot on a substrate as part of a desired image. The minute droplets may be energized to achieve an electrical charge and deflected as in the continuous ink jet printing. Conventional ink jet printers are more particularly described in U.S. Pat. Nos. 3,465,350 and 3,465,351.

Another type of ink jet printing process is an electrostatic ink jet process which employs an electrostatic field to draw the ink through the nozzle to the substrate. Charged ink droplets are drawn to an oppositely charged platen behind the receiving substrate. Such devices have been developed by Technology International Corp. of Boulder, Colo., under the trade name ESIJET™.

To operate satisfactorily within an ink jet printer, the ink has many requirements. The ink must exhibit low viscosity values (preferably below 20 centipoise at 25 C), contain no large particulate matter (typically below 5 $\mu$m), and be sufficiently stable so as not to dry and clog the jet orifice when not in use. For "continuous" ink jet printing, the ink must be conductive with a resistivity value typically below 10,000 ohms and the unused ink is preferably recyclable. Secondary factors must also be considered, such as avoiding the generation of flammable vapors during use and minimizing the impact on the environment.

Operating satisfactorily within an ink jet printer addresses only some of the requirements of the ink. The ink must also dry rapidly and bond to the substrate to which it is applied such as coated and uncoated papers to provide printed images or indicia without smearing.

These inks sometimes do not contain a binder for the pigment or dye therein and these pigments or dyes to must be absorbed into the surface of the print medium to provide stable printed images or indicia. Some of the requirements of jet printing inks are described in U.S. Pat. No. 4,258,367.

It is desirable to provide jet inks with more versatile properties. It is also desirable to provide a simple means for dispensing fragrances and for forming scented printed articles such as greeting cards with fragrant printed images and indicia.

SUMMARY OF THE INVENTION

General objectives of this invention are the generation of fragrant aromas from printing operations and the production of scented printed articles, particularly those with paper substrates.

A specific object of this invention is to provide a printing ink for ink jet printing which generates fragrant aromas during printing and produces fragrant printed articles.

An additional object of this invention is to provide a printing ink for ink jet printing which generates fragrant aromas during printing and produces fragrant printed articles when used in conventional ink jet printers without a loss in print quality.

Another object of this invention is to provide scented printed articles with fragrant images and/or indicia obtained by ink jet printing.

Further objects of the present invention will become apparent from the detailed disclosure and claims herein.

The present invention provides jet inks which generate fragrant aromas through the incorporation of at least one fragrant oil which vaporizes during printing with an ink jet printer and vaporizes from the printed images and indicia on the surfaces of printed articles formed from the jet ink. The jet inks comprise at least one coloring agent selected from pigments and dyes and a carrier for the color agent. The one or more fragrant oils are soluble or dispersible in water, alcohol or glycol solvent which is compatible with the carrier for the coloring agent or is the carrier for the coloring agent.

The printed articles comprise a substrate with an absorptive surface with an image and/or indicia printed thereon by ink jet printing. The image and indicia comprise a coloring agent bound to the absorptive surface either by a binder within the substrate, a binder within the image/indicia or both a binder within the substrate and the image/indicia. Where the image/indicia contains a binder, it may be cured in place, preferably by a cationic curing mechanism.

DETAILED DESCRIPTION OF THE INVENTION

The jet inks of this invention may generally be comprised of the following components:

a) at least one fragrant oil which vaporizes when jetted from a nozzle of an ink jet printer, b) one or more coloring agents selected from pigments and dyes, preferably in an amount of about 10 wt % of the total ink composition and c) a carrier for said coloring agent, preferably selected from water, plasticizers, alcohols and glycols, d) optionally, binders which are soluble or dispersible in the carrier for the coloring agent, e) optionally, performance additives such as pigment dispersants and defoamers and f) optionally, a propellant such as low boiling solvent other than the carrier for the coloring agent.

The one or more fragrant oils are soluble or dispersible in the carrier for the coloring agent which is typically water, an alcohol or glycol solvent or a plasticizer. The fragrant oil in said ink composition is preferably used in an amount within the range of 0.05 wt % to 5 wt %, preferably 0.1 wt % to 2 wt %. Essentially any fragrant oil soluble or dispersible in the carrier at these levels can be used in this invention. These fragrant oils vary widely in composition and aroma and include commercially available perfumes for both men and women as well as commercially available scents for air fresheners and candles. Also included are the essential oils used in aroma therapy which include the following oils available from WORLD DIRECT, Paola, KS:

Basil (*Ocimum basilicum*)
Bergamot (*Citrus aurantium bergami*)
Birch (*Betula alleghaniensis*)
Cedarwood (*Cedrus atlantica*)
Chamomile, Roman (*Chamaemelum nobile*)
Cinnamon Bark (*Cinnamomum verum*)
Cistus (*Cistus ladaniferus*)
Clary Sage (*Salvia sclarea*)
Clove (*Eugenia caryophyllus*)
Coriander (*Coriandrum sativum*)
Cypress (*Cupressus sempervirens*)
Davana (*Artemisa pallens*)
Dill (*Anethum graveolens*)
Eucalyptus (*Eucalyptus globulus*)
Fennel (*Foeniculum vulgare*)
Fir (*Abies alba*)
Frankincense (*Boswellia carterii*)
Galbanum (*Ferula gummose*)
Geranium (*Pelargonium graveolens*)
Ginger (*Zingiber officinale*)
Helichrysum (*Helicrysum italicum*)
Hyssop (*Hyssopus officinalis*)
Jasmine (*Jasminum officinale*)
Juniper Berry (*Juniperus communis*)
Laurus Nobilis
Lavender (*Lavendula officinalis*)
Lemon (*Citrus limon*)
Lemongrass (*Cymbopogon flexuosus*)
Margoram (*Origanum majorana*)
Melaleuca (*Melaleuca alternifolia*)
Mountain Savory (*Satureja montana*)
Myrrh (*Commiphora molmol*)
Myrtle (*Myrtus communis*)
Nutmeg (*Myristica fragrans*)
Orange (*Citrus aurantium*)
Oregano (*Origanum compactum*)
Patchouly (*Popostemon cablin*)
Pepper, Black (*Piper nigrum*)
Peppermint (*Mentha piperita*)
Petitgrain (*Citrus aurantium*)
Ravensara
Rose, Turkish (*Rosa damascena*)
Rosemary (*Rosmarinus officinalis*)
Rosewood (*Aniba rosaeodora*)
Sage (*Salvia officinalis*)
Sandalwood (*Santalum album*)
Spikenard
Spearmint (*Mentha spicata*)
Spruce (*Picea mariana*)
Tangerine (*Citrus tangerina*)
Tarragon (*Artemisia dracunculus*)
Thyme (*Thymus vulgaris*)
Vetiver
Vitex
White Lotus (*Nymphaea lotus*)
Wild Tansy (*Tanacetum vulgare*)
Ylang Ylang (*Cananga odorata*)
and the like.

The ink formulations of the present invention contain a coloring agent which is capable of being sensed visually, by optical means, by magnetic means, by electro conductive means or by photoelectric means. Suitable coloring agents are those used in conventional ink jet formulations. The coloring agent is typically a dye or pigment and can be selected from a variety of organic and inorganic pigments and dyes. Examples include phthalocyanine dyes, carbon blacks, fluorescent naphthalimide dyes and others such as cadmium, primrose, chrome yellow, ultra marine blue, iron oxide, zinc oxide, titanium oxide, cobalt oxide, nickel oxide, etc. Other examples of coloring agents include those described in U.S. Pat. No. 3,663,278 and U.S. Pat. No. 4,923,749. Reactive dyes such as leuco dyes and diazonium compounds are also suitable. The total amount of coloring agent is typically from about 0.01–10 wt. % of the total ink formulation. The pigments such as carbon black are of a size less than 5 $\mu$m.

Water and low molecular weight (low viscosity, low boiling) alcohols and glycols can be used as carriers for the coloring agents. The low boiling alcohols will also function as a propellant where the ink is used in thermal jet printing. Suitable examples of alcohols include monovalent alcohols such as methyl alcohol, ethyl alcohol, n-propyl alcohol, isopropyl alcohol, n-butyl alcohol, sec-butyl alcohol, tert-butyl alcohol, isobutyl alcohol, n-amyl alcohol, hexyl alcohol, heptyl alcohol, octyl alcohol, mixtures thereof and the like. Suitable examples of glycols include ethylene glycol, polyether polyols, diethylene glycol, triethylene glycol, 1,2-propylene glycol, dipropylene glycol, 1,3-butanediol, 1,4-butanediol, glycol, trimethylol propane, 1,6-hexanediol, pentaerythritol, trimethylol propane, tetramethylolpropane, dipentaerythritol mixtures thereof and the like. Solvents which may be mixed with the alcohols or glycols are ketones, aldehydes, ethers, esters, hydrocarbons, glycol ethers and lactones. Suitable hydrocarbons include hexane, heptane, octane, decane, cyclopentane, cyclohexane, benzene, toluol, xylol, ethylbenzene mixtures thereof and the like. Suitable hydrocarbon halides include carbon tetrachloride, ethylene dichloride, trichloroethylene, tetrachloroethane, dichlorobenzene mixtures thereof and the like. Suitable ether type solvents include butyl ether, ethylene glycol-diethylether, ethylene glycolmonoethyl ether, ethylene glycol-monobutylether mixtures thereof and the like.

Suitable ketones include acetone, methyl ethyl ketone, methyl propyl ketone, methyl isobutyl ketone, methyl amyl ketone, cyclohexanone mixtures thereof and the like. Suitable esters include ethyl formate, methyl acetate, propyl acetate, butyl acetate, phenyl acetate, ethylene glycol-monoethyl ether acetate, methylpropionate mixtures thereof and the like.

Plasticizers such as those described in U.S. Pat. No. 3,663,278, may also be used as carriers to aid flexibility of the image formed and/or reduce the viscosity of the ink. Suitable plasticizers include adipic acid esters, phthalic acid esters and ricinoleate acid esters, citrates, epoxides, glycerols, hydrocarbons, chlorinated hydrocarbons, phosphates and the like.

The amount of carrier can range from 10 to 95 wt. % of the total ink formulation. Preferably, the carrier comprises about 75 wt. % of the total ink formulation where the carrier evaporates on the substrate.

Optional binders include those which are soluble or dispersible in the carrier (plasticizers, water, alcohols or glycols) for the coloring agent. This includes those binders used in conventional jet printing inks such as acrylic polymers as described in U.S. Pat. No. 5,244,496 and polyethylene oxide polymers. Suitable binders also include sugar and alcohol binders (U.S. Pat. No. 5,711,791), cellulosic polymers (U.S. Pat. No. 5,755,860), those described in U.S. Pat. Nos. 5,672,198; 5,663,217 and 4,990,186 and the reactive binders disclosed in U.S. Pat. No. 5,641,346 and copending application Ser. No. 08/792,827, filed Jan. 30, 1997, assigned to the same assignee herein and entitled "UV or Visable Light Initiated Cationic Cured Ink for Ink Jet Printing".

The ink formulations of the present invention typically comprise from 5 to 15 wt % optional binder, based on the total composition. Preferred amounts range from 1–10 wt. % optional binder, based on the total composition. Preferred levels of optional binder will depend on the polymer(s) used and their viscosity.

Optional additives which may be incorporated to improve the properties as jet printing inks including dispersing agents to help solubilize the pigment or dye, fillers, defoaming agents, flow adjusters, leveling agents or cobwebbing preventative agents. Illustrative examples of flow adjusters are low molecular weight organopolysiloxanes such as methylpolysiloxanes which may be used in an amount of 0.01-10 wt. % based on weight of the total ink formulation. An illustrative example of a defoamer is Anti-Musal JIC, which may be used in an amount of 0.01–10 wt. % based on the weight of the total ink formulation. Illustrative examples of leveling agents are low molecular weight polysiloxane/polyether copolymers and modified organic polysiloxanes, which may be used in an amount of 0.01–10 wt. % based on the weight of the total ink formulation.

Other suitable additives desired for jet ink printing are those which reduce bacterial growth (Towisyl 75), modify viscosity, which provide wettability (butylcarbitol), humectants which prevent the composition from drying out within the print head (polyethylene glycols), which enhance the conductivity of the ink formulation for use in continuous ink jet printers and photostabilizers which prevent polymerization of inks by natural or ambient light. Other suitable additives include oil, weatherability improvers such as UV light absorbers, flexibilizers (oil) and fillers.

Where the ink composition is to be used in a thermal jet printer, it contains a propellant, which is typically a low boiling liquid such as a low molecular weight alcohol or water and is typically the carrier for the coloring agent. Low boiling solvents which are not carriers for the coloring agent can also be used as propellants. The amount of propellant can range from 10 to 95 wt. % of the total ink formulation. Preferably, the propellant comprises about 75 wt. % of the total ink formulation. Where the ink composition is to be used in a "continuous" ink jet process, a propellant is not needed. The droplets are formed by a vibrating crystal and deflected by an electric field. The ink composition preferably has a resistivity of less than 10,000 ohms/cm to achieve deflection.

The above components can be mixed and dispersed uniformly by an appropriate means such as a simple impeller within a vessel or a roll mill to obtain the ink composition of the present invention.

The ink formulations of the present invention have a viscosity in the range of 1–200 cps at 25 C, preferably 1–100 cps and most preferably between 1–25 cps to allow use within conventional ink jet printers. Where the optional binders have a viscosity much higher than 50 cps, they are diluted with a low viscosity carrier such as a plasticizer or organic solvent (alcohols or ketones).

The jet inks of the present invention adhere well to various substrates such as coated and uncoated paper, wood and plastics and show no removal or peeling off from the surface caused by stress or strain with the deformation of the substrate.

The scented printed articles of the present invention include a substrate with an absorptive surface with a fragrant image and/or indicia printed thereon by ink jet printing. The image and indicia comprise a fragrant oil and a coloring agent as defined above. The coloring agent is bound to the absorptive surface of the substrate by a binder. The binder can vary significantly in composition depending on whether it is incorporated within the substrate, whether it is incorporated within the image/indicia, whether it is incorporated within both the substrate and the image/indicia or whether it is cured in place. Where the image/indicia contains a binder cured in place, it is preferably cured by a cationic curing mechanism.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. All publications and patents cited above and below are hereby incorporated by reference.

In the foregoing and in the following examples, all temperatures are set forth in degrees Celsius and unless otherwise indicated, all parts and percentages are by weight.

EXAMPLES

Example 1

Ink Formulation

An ink formulation of the present invention is prepared by combining 20 ml of a black jet ink which comprises a carbon black pigment in a liquid carrier, available from Renewable Resources Inc. Staten Island, N.Y. under the trade name REINK, and 0.05 ml of a commercially available perfume sold under the trade name "Anais Anais" by Parfums Cacharel Paris. The resulting ink does not significantly change in viscosity.

The ink is employed in an Epson 400 ink jet printer for over thirty days without clogging the jet orifices and with no change in print quality with respect to print resolution and durability. A fragrant aroma characteristic of "Anais Anais" is detected with each printing of over 25 words.

Example 2

Imaged Substrate

An 8"×11" sheet of uncoated bond paper from XEROX is feed through an Epson 400 ink jet printer loaded with the black jet ink of Example 1. Two paragraphs of text in CG Times font, 12 pt size, totaling 100–200 words were printed on the sheet. A fragrant aroma characteristic of "Anais Anais" is detected from the sheet for 1–2 days. The ink on the paper is not tacky once dispensed from the printer and shows good adhesion to the paper.

The preceding examples can be repeated with similar success by substituting the generically or specifically described components and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An ink jet composition which generates fragrant aromas during printing, which comprises:

a) one or more coloring agents selected from the group consisting of pigments and dyes;

b) a carrier for said coloring agent; and c) at least one fragrant oil which vaporizes when jetted from a nozzle of an ink jet printer and is soluble or dispersible in the carrier for said coloring agent, wherein the carrier for said coloring agent is free of water and is selected from the group consisting of alcohols and combinations thereof.

2. An ink jet composition which generates fragrant aromas during printing, which comprises:

1) one or more coloring agents selected from the group consisting of pigments and dyes;

2) a carrier for said coloring agent selected from a group consisting of water, alcohols and glycols, and 3) at least one fragrant oil which vaporizes when jetted from a nozzle of an ink jet printer and is soluble or dispersible in the carrier for said coloring agent which additionally contains a low boiling solvent other than water, alcohols and glycols which can function as a carrier for the coloring agent and a propellant.

3. An ink composition which generates fragrant aromas during printing which comprises:

a) a coloring agent;

b) a carrier for said coloring agent selected from the group consisting of water, alcohols and glycols, and c) at least one fragrant oil which vaporizes when jetted from a nozzle of an ink jet printer and is soluble or dispersible in the carrier for said coloring agent, wherein the coloring agent is carbon black at a particle size of less than 5 $\mu$m.

* * * * *